United States Patent [19]
Fantone

[11] Patent Number: 5,526,177
[45] Date of Patent: Jun. 11, 1996

[54] DUAL-VIEW, IMMERSIBLE PERISCOPE

[75] Inventor: Stephen D. Fantone, Lynnfield, Mass.

[73] Assignee: Mobi Corporation, Lynnfield, Mass.

[21] Appl. No.: 195,531

[22] Filed: Feb. 14, 1994

[51] Int. Cl.$^6$ .................. G02B 23/08; G02B 23/22; G02B 5/08

[52] U.S. Cl. .................. 359/402; 359/403; 359/742; 359/857

[58] Field of Search .................. 359/402, 403, 359/405, 406, 482, 850, 855, 857, 858, 871, 895, 856, 742

[56] References Cited

U.S. PATENT DOCUMENTS

| | | | |
|---|---|---|---|
| 849,570 | 4/1907 | Pino | 359/402 |
| 1,300,901 | 4/1919 | Warner | 359/857 |
| 1,590,463 | 6/1926 | Wood | 359/857 |
| 2,364,670 | 12/1944 | Stamy et al. | 359/857 |
| 2,909,959 | 10/1959 | Girden | 359/857 |
| 2,968,208 | 1/1961 | Shaw | 359/406 |
| 3,551,032 | 12/1970 | Dunn | 359/857 |
| 4,065,206 | 12/1977 | Tausch | 359/857 |
| 4,110,011 | 8/1978 | Tausch | 359/857 |
| 4,149,778 | 4/1979 | Tausch | 359/857 |
| 4,887,893 | 12/1989 | Dahlgren | 350/618 |

FOREIGN PATENT DOCUMENTS

| | | | |
|---|---|---|---|
| 2610732 | 8/1988 | France | 359/402 |
| 3627716 | 2/1988 | Germany | 359/402 |
| 0201621 | 8/1989 | Japan | 359/858 |

Primary Examiner—Ricky D. Shafer
Attorney, Agent, or Firm—Francis J. Caufield

[57] ABSTRACT

A low-cost, dual-view, immersible periscope that is particularly suitable for use as a toy or learning tool in environments such as bath tubs, sinks, tidal pools, outdoor wadding pools, or other aquatic areas where children play and explore. The periscope has an upper viewing compartment that operates in air and a lower compartment that floods with water as the periscope is immersed and contains the entrance aperture. The upper and lower compartments are separated from one another with a transparent window, which the upper compartment surrounds isolate its air space from surrounding water to provide a completely still image of activity taking place beneath the surface even though it may be turbulent with wave action. Additional enhancements include magnification, underwater accessory lighting, sound effects, torpedo tubes, and means for placing transparencies over the entrance aperture to integrate images with underwater action.

19 Claims, 5 Drawing Sheets

DUAL-VIEW, IMMERSIBLE PERISCOPE

BACKGROUND OF THE INVENTION

1. Field of the Invention

This invention relates generally to periscopes and, more particularly, to low-cost periscopes that are immersible in fluids such as water.

2. Description of the Prior Art

Periscopes are well-known optical instruments that deviate or displace an observer's line of sight to provide a perspective from a distant position that would otherwise be inaccessible or dangerous. This is accomplished by arranging reflecting elements, such as mirrors or prisms, in a tubular structural member such that incoming light rays from an object are collected at one end of the instrument, distant from the observer, and directed along a folded optical path to the proximal end located near the observer's direct line of sight.

The fundamental and simplest form of periscope consists of a pair of parallel reflecting surfaces arranged in oppositely facing directions along a longitudinally extending tube of rectangular or circular cross-section. The reflecting surfaces here are either prisms or plane mirrors. One of the reflecting surfaces is placed at the distal end of the tube to fold incoming rays by 90-degrees for travel along the length of its longitudinal axis. The other mirror is placed at the proximal end, some predetermined distance from the distal end, to intercept oncoming light and fold it through another 90-degrees for travel downstream to the observer.

In its most fundamental form, the periscope has been used for some time now to provide otherwise inaccessible views in a variety of environments ranging from its relatively safe use as a hydroscope for inspecting underwater objects such as boat hulls and pier structures to its more dangerous use as a visual aid in tanks or other military vehicles.

More complex forms are also known and are often used for military and navigational applications. Such systems typically employ complex optical elements beyond the just the two reflecting surfaces of the fundamental form. Usually, complex optics are placed in the intervening space between purely reflecting elements, or straddle one or more of them, to provide a variety of functions including magnification, measurement, distance ranging, targeting, or increased field of view. Typical examples here include the rather lengthy telescoping submarine periscope and the compact sextant periscope for celestial navigation during flight.

Aside from industrial, commercial, and military uses, periscopes have long been used in their fundamental form as toys and as learning aids for teaching optical principles. For this purpose, they need to be low-cost, robust, and simple to use and manufacture. One known approach to satisfying the foregoing requirements is shown and described in U.S. Pat. No. 4,887,893 entitled "PERISCOPE WITH ONE PIECE HOUSING AND MIRROR HOLDING ELEMENTS" issued on Dec. 19, 1989 in the name of Lennart Dehlgren. Dehlgren's primary concern is with low-cost and ease of assembly of a toy periscope. To accomplish these goals, a blow molded plastic tube is fitted with two snap-in end caps which carry the necessary reflecting mirrors for a periscope of simple form. However, there is no consideration given to the use of a periscope in a fluid environment such as water or one that has additional functionality as a learning tool or action toy.

Consequently, it is a primary object of the present invention to provide a low-cost periscope for use as a toy or learning tool.

It is another object of the present invention to provide a periscope that can be used to provide a view under the water.

It is yet another object of the present invention to provide a simple periscope that is capable of viewing along two different paths under water.

It is still another object of the present invention to provide a low-cost, simple to use periscope that is adapted for use either as a toy or a learning tool for use in a variety of aquatic environments where children play and learn.

Other objects of the invention will be apparent and will appear hereinafter in the following detailed description.

SUMMARY OF THE INVENTION

A low-cost, dual-view, immersible periscope that is particularly suitable for use as a toy or learning tool in environments such as bath tubs, sinks, tidal pools, outdoor wadding pools, or other aquatic areas where children play and explore.

The periscope consists of a vertically oriented, multisided housing that is physically divided into upper and lower compartments by a sloping transparent window. The upper compartment operates in air, and the lower compartment, which is weighted to sink the periscope, operates in water which floods it as the periscope sinks of its own weight.

The vertically extending sides of the upper compartment surround the transparent window and provide a viewing aperture through which an observer looks. On one of the interior sides of the upper compartment is a mirror which serves to fold the observers line of sight downwardly and rearwardly through the transparent window. Another mirror located beneath the transparent window in the lower compartment folds the observer's line of sight again, directing it forwardly through the lower compartment entrance aperture. For this dual bounce view, which is folded twice, two mirrors operate in conjunction to provide a generally forward view of underwater action. However, an observer may also use just the lower mirror for a single folded view of the forward action.

Wave action or other turbulent surface effects are prevented from disturbing the view through the transparent window because the sides of the upper compartment are designed to serve as a barrier against them, and any water that inadvertently enters the upper compartment may be easily removed by simply turning the periscope over or simply runs down the sloped transparent window to collect along the lower of its edges where it does not interfer with the observer's view.

Additional enhancements to the periscope include magnification, underwater accessory lighting, sound effects, torpedo tubes, and means for placing transparencies over the entrance aperture to integrate images with underwater action.

DESCRIPTION OF THE DRAWINGS

The structure and operation of the invention, together with other objects and advantages thereof, may best be understood by reading the detailed description in connection with the drawings in which unique reference numerals have been used throughout for each part and wherein.

DETAILED DESCRIPTION

This invention relates to a low-cost, dual-view, immersible periscope that is particularly suitable for use as a toy or learning tool in environments such as bath tubs, sinks, tidal pools, outdoor wadding pools, or other aquatic areas where children play and explore. However, it should be kept in mind from the outset that the inventive periscope may also be used for other applications such as in the inspection of underwater objects like boat hulls or piers or to provide views of otherwise inaccessible objects.

Figure 1:
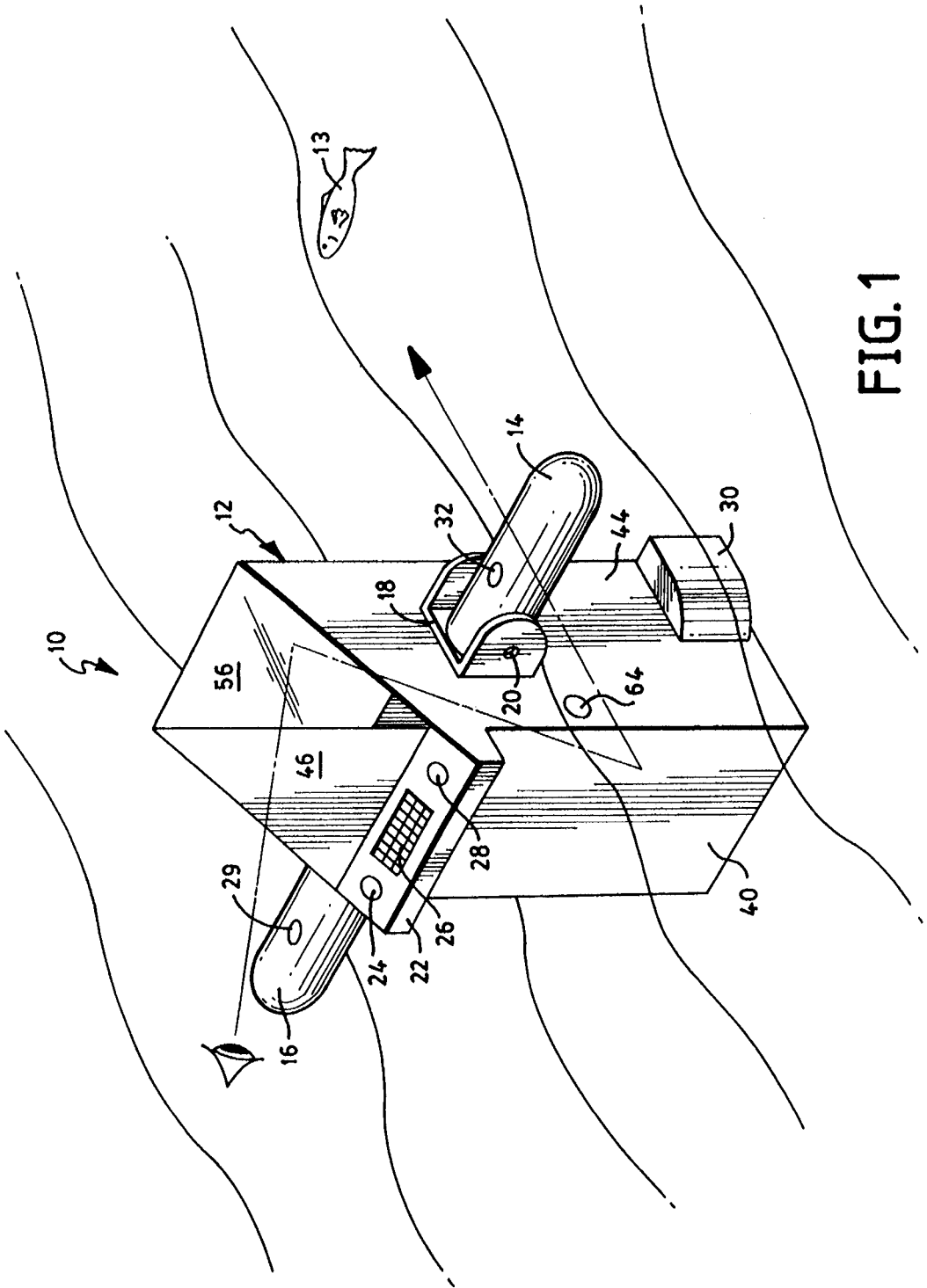
FIG. 1 is a diagrammatic perspective view of the dual-view periscope of the invention shown partially immersed in water.

Reference is now made to FIG. 1 where one embodiment of the inventive periscope, which is generally designated at 10, is shown partially submerged in turbulent water and operates in a manner to be described to provide clear, undisturbed views of a fish 13 or other underwater activity, even though the surface of the water may be agitated by wave action or the like or by surface conditions, like suds in a tub, which would otherwise obstruct the view.

As can be seen in FIG. 1, periscope 10 comprises a generally vertically extending housing 12 that is formed of four panels comprising a rear panel 40, a front panel 42, a right side panel 44, a left side panel 46 (See FIGS. 5 and 6), and a bottom panel 45. Housing 12 is preferably injection molded of plastic as a single integral part but obviously may be formed by any number of well-known alternative processes or materials. Plastic is preferred, however, because of its ease of fabrication, water resistance, and durability. While shown substantially as a square, housing 12 may also take on other cross-sectional shapes such as that of a rectangle, circle, or oval.

Located on each side panel 44 and 46 are handles 14 and 16, respectively, for transporting, maneuvering, rotating or otherwise manipulating periscope 10. Each handle, 14 and 16, is mounted to its respective side panel, 44 and 46, via a bracket 18 provided with a pivot pin 20 (only one side shown) to permit the handle to be folded into a vertical orientation by rotation about pivot 20, thus permitting for more compact storage of periscope 10. However, handles may be fixed in place as opposed to folding to lower costs.

Figure 2:
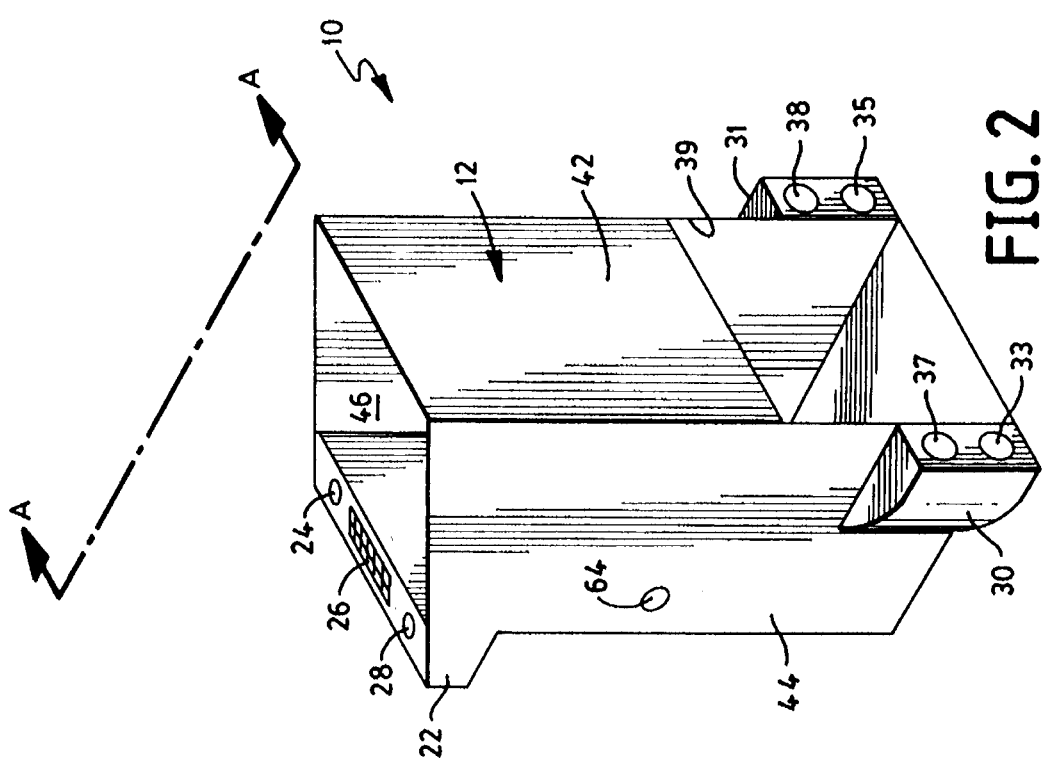
FIG. 2 is a different diagrammatic perspective view of the periscope of FIG. 1, shown without its folding handles.

Extending outwardly from each side panel 44 and 46, near the bottom of periscope 10 and aimed generally forwardly, are a pair of auxiliary housings, 30 and 31, respectively (See FIG. 2). Each auxiliary housing, 30 and 31, includes an underwater light, 33 and 35, respectively, and a torpedo tube, 37 and 38, respectively.

Projecting from the top of rear panel 40 is an instrument console 22 on which are arranged a waterproof switch 24 for activating underwater lights, 33 and 35, a waterproof speaker 26 connected with a well-known audio chip 49 (See FIGS. 4 or 5), and a waterproof switch 28 for turning on audio chip 49 to play one or more predetermined messages. Batteries may also be conveniently housed in instrument console 22 as needed.

Torpedoes may be placed in tubes, 37 and 38, respectively, and held therein via well-known compression spring and latch arrangements and then released via cable triggers connected, also in well-known manners, to a pair of torpedo firing buttons, 29 and 32, located respectively, on handles 16 and 14, respectively.

Figure 3:
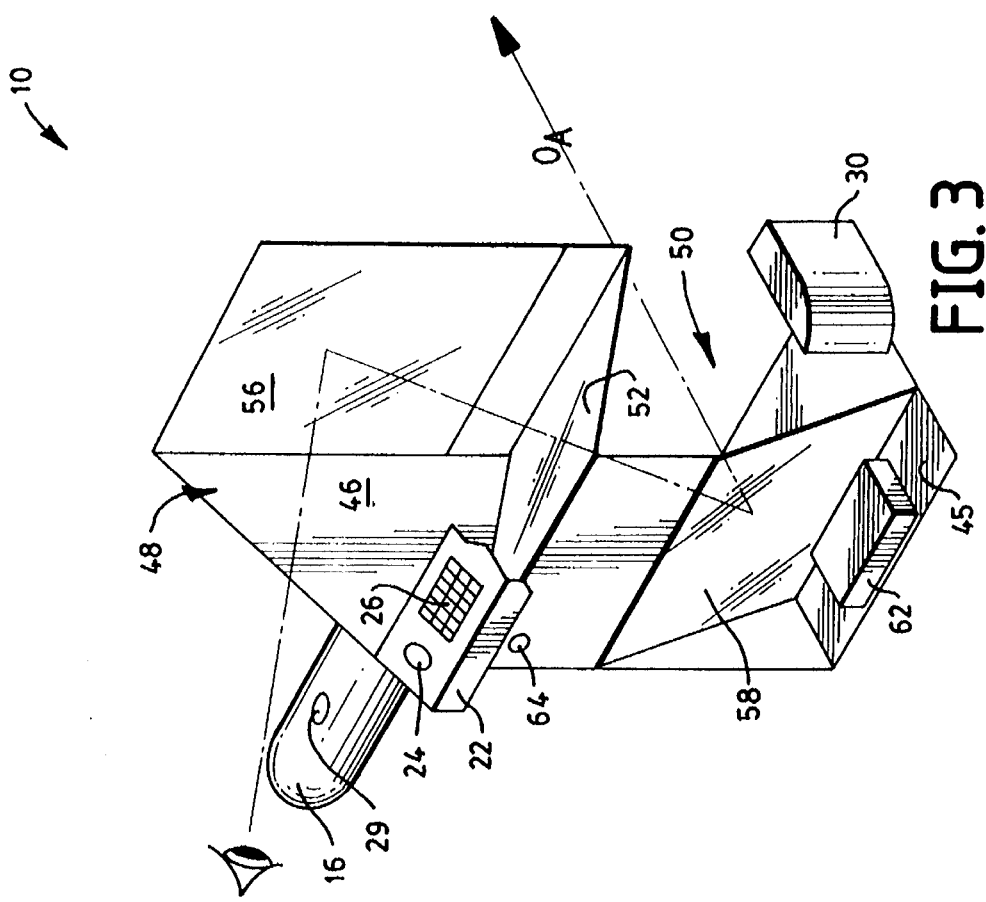
FIG. 3 is a diagrammatic perspective view of the periscope of FIG. 1 shown with parts broken away.
Figure 5:
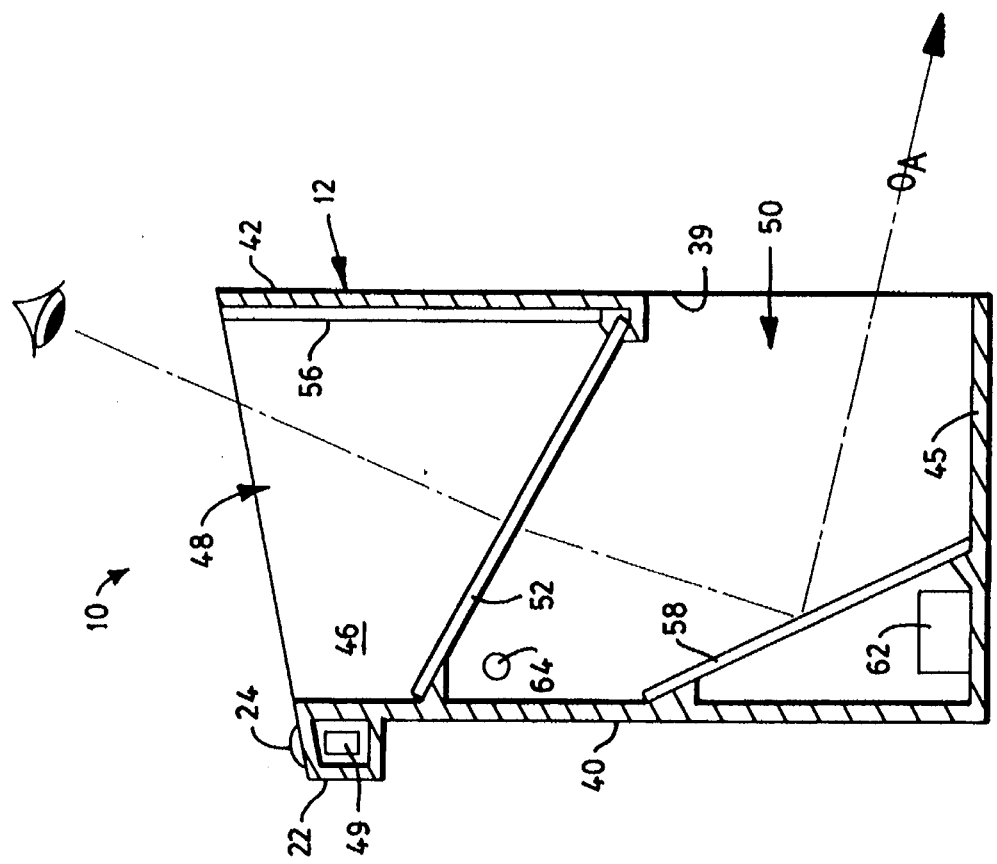
FIG. 5 is another diagrammatic cross-sectional elevational view of the periscope of the invention taken generally along line a—a in FIG. 2 and showing the other of its two possible viewing paths.
Figure 4:
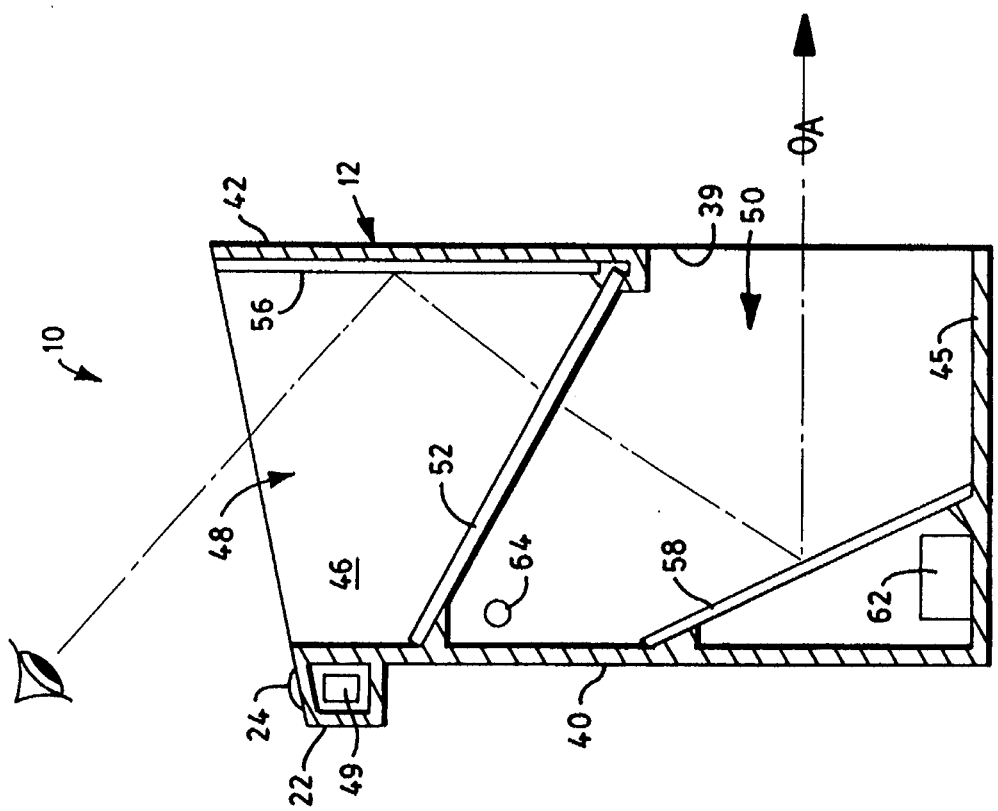
FIG. 4 is an diagrammatic cross-sectional elevational view of the periscope of the invention taken generally along line a—a in FIG. 2 and showing one of its two possible viewing paths.
Figure 6:
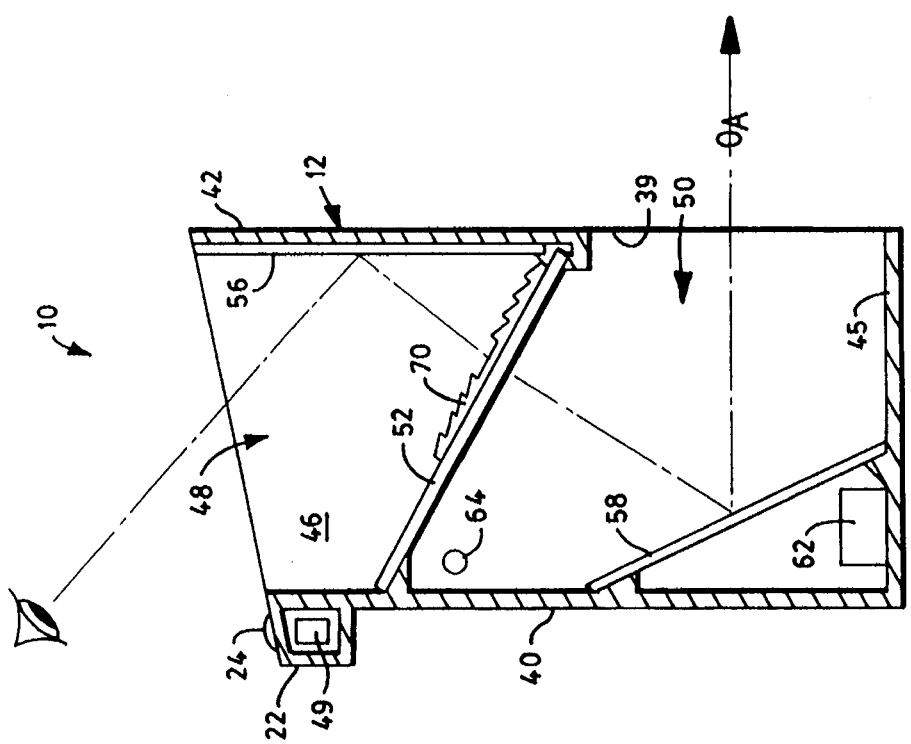
FIG. 6 is a diagrammatic cross-sectional elevational view of another embodiment of the invention incorporating a magnification feature.

Referring now to FIGS. 3, 4, and 5, it can be seen that housing 12 is divided into upper and lower compartments (designated generally at 48 and 50, respectively) via a forwardly and downwardly sloping transparent window 52, which is preferably molded of plastic. Upper compartment 48 is designed to operate in air while lower compartment may operate either in air or water, but preferably in water at an index of refraction of 1.33.

On the inside surface of front panel 42 is mounted a plane mirror 56, and a plane mirror 58 is provided in lower compartment 50. Mirror 58 extends at a angle between the inside surface of the lower part of rear panel 40 and the inside surface of bottom panel 45. Mirrors 56 and 58 are preferably formed of coated acrylic sheet for cost purposes. They are preferably formed of a thickness sufficient to be self-supporting and rigid for distortion free views.

In the lower portion of front panel 42 is an entrance aperture 39 that is defined in part by edges of bottom panel 45, side panels 44 and 46 and front panel 42. Aperture 39 directly faces mirror 58.

For reasons to follow, an air escape hole 64 is formed in each side panel, 44 and 46, in lower compartment 50.

As best seen in FIGS. 3, 4, and 5, a weight 62 is provided of sufficient size to achieve sink periscope 10 so that it will sit submerged on bottom panel 45 when in water shallower than the height of housing 12 or be vertically oriented in the event that the water depth in which it is used is too deep for the length of housing 12. Alternatively, weight 62 may be chosen so that periscope 10 always floats even if it upper compartment is flooded or always floats with its viewing aperture up and just out of the water no matter what the water depth may be.

In use, one grasps periscope 10 by handles, 14 and 16, and slowly immerses the bottom of it into water. This causes lower compartment 50 to flood with water with most of the air displaced from it via entrance aperture 39. Any remaining air that may be trapped in compartment 50 finds it way out via air escape holes 64 so that compartment 50 is completely filled with water at an index of refraction of 1.33. In this way, upper and lower compartments are separated by an air/water interface at transparent window 52, and as can be appreciated, this interface is generally prismatic, operating to bend light generally toward the normal of transparent window 52, provided that upper compartment 48 is kept water free. As a general rule, rays of small incidence angle traveling from air will propagate toward mirror 58 in water at an angle reduced by a factor of 1.33.

FIG. 4 shows one of the two possible views that are provided by periscope 10. As can be seen, this view is forward looking for an observer located to the rear of periscope 10. Also notice that this is a double-bounce path, since the observers line of sight is folded twice before it emerges beneath the surface of the water looking forwardly through entrance aperture 39.

The other view that periscope 10 is capable of providing is the single bounce one of FIG. 5. Here, an observer located in front of periscope 10 also looks in a forward direction which may also be slightly down, depending on the orientation of housing 12. The various angles, mirror sizes, and locations may be established by the application of well-known laws of reflection and refraction, keeping in mind that the overall field of view of the periscope is dictated by the geometry of the tunnel, size of entrance aperture 39, and position of the observer's eye.

Using either one of the available dual views, it will be appreciated that an important feature of the inventive periscope resides in its ability to shield the part of its optical path that is in air, on the viewer's side, from surface disturbances which would otherwise distort the view of underwater objects much as the distorted view one sees of sunlight dancing on the bottom of a swimming pool when the surface is wavy. This feature obviously is achieved by virtue of the fact that the upper compartment 48 isolates its air space completely from outside water surface agitation.

Where a magnified view of underwater action is needed, a positive Fresnel lens 70 (See FIG. 6) may be placed over transparent window 52 either as a separate piece or molded integrally with it as a unitary piece. Also, it is possible to achieve a similar effect by placing such a lens directly over entrance aperture 39 provided one accounts for the fact that such a lens would be immersed in water.

Figure 7:
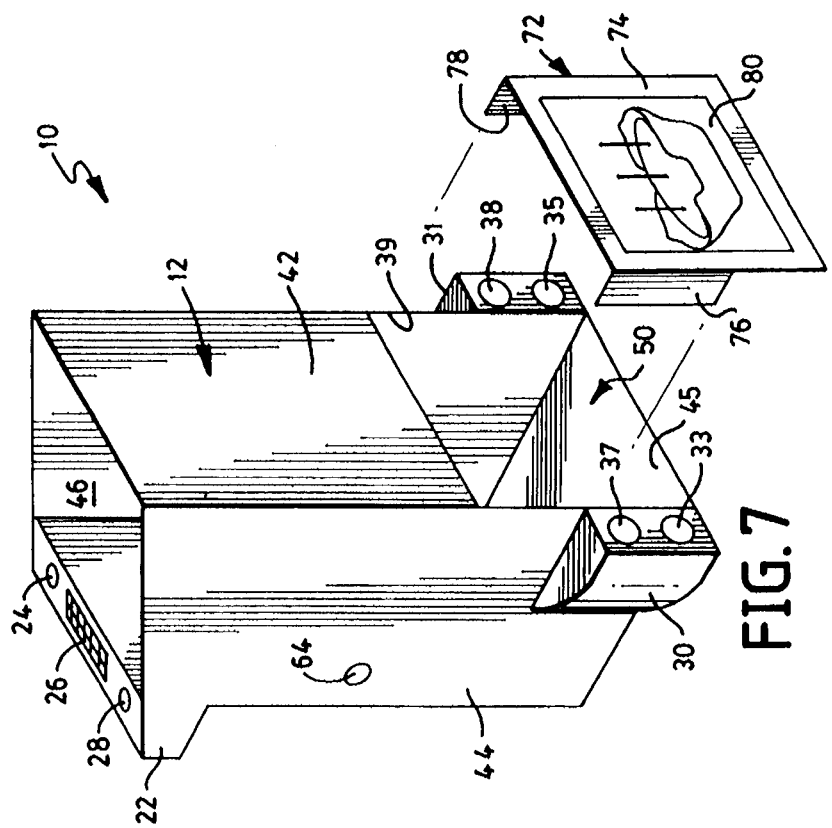
FIG. 7 is a diagrammatic perspective view of the inventive periscope of FIG. 3 shown in conjunction with another aspect of the invention.
Figure 8:
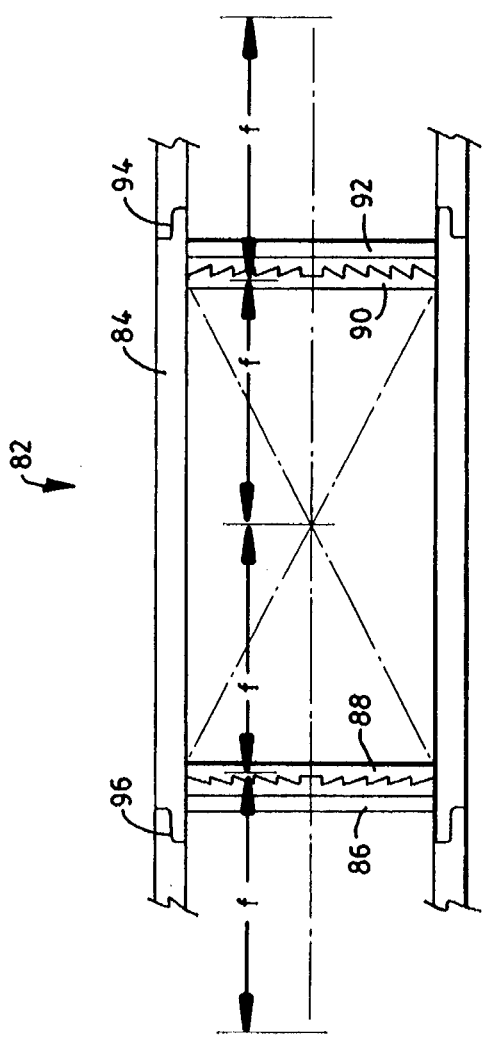
FIG. 8 is a diagrammatic cross-sectional elevational view of a relay lens system that may be used to increase the length the inventive periscope.

Referring now to FIG. 7, there is illustrated yet another feature of the invention. This feature provides a means by which the underwater view may be enhanced with graphics provided by the observer. These may be utilitarian where instruction is to be provided of underwater marine environments or purely fanciful where play is involved. Such graphics are provided via transparencies by placing a transparency mount 72 over entrance aperture 39. For this purpose, mount 72 is preferably formed of plastic and comprises a frame 74 which is filled with a transparency such as the one depicted as a sunken boat 80. Frame 74 has a pair of tabs, 76 and 78, also of plastic, which extend rearwardly form it and are bent slightly inwardly so that they are spring like. Tabs, 76 and 78, engage side panels, 44 and 46, to hold frame 72 in place over entrance aperture 39. Obviously, any number of transparencies with different themes and/or pedagogical purposes may be made available.

Where a longer periscope than that depicted in FIGS. 1–7 is needed, the additional length may be provided by one or more relay lens systems such as that designated at 82 in FIG. 8. As can be seen in FIG. 8, relay lens system 82 comprises a tubular housing 84 in which are mounted four optical elements, a pair of outboard plano clear plates 86 and 92 and a corresponding pair of inboard identical positive Fresnel lenses, 88 and 90, which may be of well-known design. Each clear plate and Fresnel lens pair are separated by air so that the Fresnel surface of the lenses always operate in air for maximum refracting power even though the entire assembly may be immersed in water with otherwise flooded interior spaces. For this extension scheme, the Fresnel lenses 88 and 90 are optically separated with their principal planes two focal lengths distant from one another with other reflecting elements or other elements of other relay sections placed one focal length on either side of a relay section. The relay sections may be easily joined at their ends via reduced diameter sections such as those shown at 94 and 96 or by equivalent means.

Figure 9:
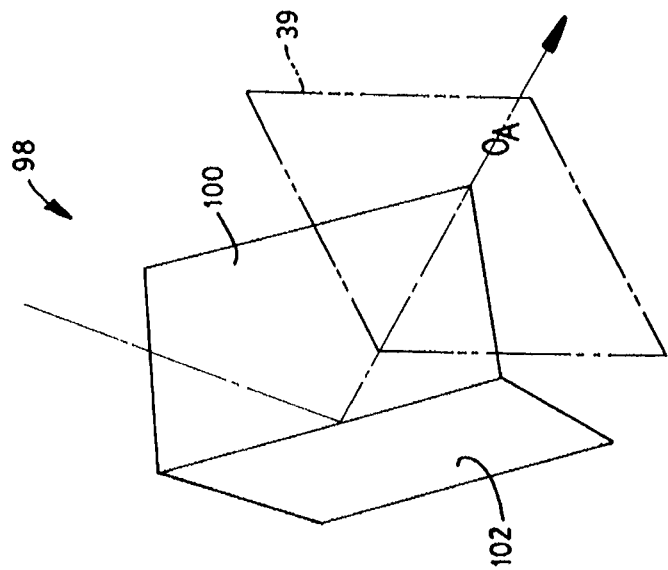
FIG. 9 is a diagrammatic perspective view of plane mirror roof arrangement that may be used in conjunction with the relay lens system of FIG. 8 to provide proper image orientation for a lengthened periscope.

For proper image orientation, relay systems like 82 are to be used in pairs, but just one may be used if it is used in conjunction with a roof mirror system such as the one shown in FIG. 9 at 98. Roof mirror system 98 which is comprised of two intersecting plane mirrors 100 and 102, operates in a well-known manner to provide proper image orientation and is mounted in place of mirror 58 opposite entrance aperture 39.

When a lens relay system like 82 is used, the periscope will take on a generally Z-shape as it lengthens. If this is too unwieldy, prism power may be integrated into the design of Fresnel lenses, 88 and 92, to straighten out the lengthened periscope housing.

Those skilled in the art may make changes to the invention without departing from the scope of its teachings. Therefore, it is intended that the embodiments described herein be considered as illustrative and not be construed in a limiting sense.

What is claimed is:

1. A dual-view, immersible periscope comprising:

an elongated tubular housing having two ends, one of said ends having an upward oriented viewing opening through which an observer may look into said housing and the other end having an entrance opening arranged generally perpendicular to said viewing opening;

means for partitioning said housing into at least two compartments, an upper compartment which encompasses said viewing opening and a lower compartment which encompasses said entrance opening, said partitioning means including transmission means by which an observer looking through said viewing opening in said upper compartment can look into said lower compartment, said lower compartment being completely immersible in a fluid without the fluid entering said upper compartment;

first reflection means mounted in said upper compartment so that an observer's line-of-sight is folded downwardly and oppositely to its initial orientation; and second reflection means mounted in said lower compartment such that it is in a position to intercept the observer's folded line-of-sight and direct it through said entrance aperture to provide a first view which is generally forward looking but offset with respect to an observer's natural line-of-sight and such that an observer may look directly at said second reflection means through said viewing opening and be provided with a second view which is offset and generally opposite to the observer's natural line-of-sight.

2. The dual-view, immersible periscope of claim 1 wherein said first and second reflection means comprise plane mirrors fabricated of reflective coated acrylic plastic.

3. The dual-view, immersible periscope of claim 1 further including a pair of handles attached to said housing for transporting, maneuvering, or manipulating said periscope.

4. The dual-view, immersible periscope of claim 1 wherein said housing includes a vent hole in an upper portion of said lower compartment so that any air that may be trapped therein may escape when said lower compartment is immersed in said fluid.

5. The dual-view, immersible periscope of claim 1 wherein said transmission means partitions said housing into said upper and lower compartments.

6. The dual-view, immersible periscope of claim 5 wherein said transmission means comprises a transparent planar sheet of plastic that sits in a plane that is at an angle with respect to both said upper and lower compartments so that, when said lower compartment is filled with said fluid, it possesses prismatic optical action and operates to bend incoming light rays towards the normal to said transparent planar sheet.

7. The dual-view, immersible periscope of claim 1 further including an instrument console located on the outside of said upper compartment thereof for mounting actuator switches and/or electronic components that are accessible to a user while said lower compartment thereof is immersed in said fluid.

8. The dual-view, immersible periscope of claim 1 further including means for releasably placing transparencies with predetermined graphics over said entrance opening in said lower compartment so that the contents of said transparencies can be integrated with said views provided by said periscope.

9. The dual-view, immersible periscope of claim 1 further including at least one auxiliary housing located on the exterior of said housing lower compartment adjacent said lower compartment entrance opening.

10. The dual-view, immersible periscope of claim 9 wherein said auxiliary housing is adapted to receive waterproof lights to provide underwater illumination of said views available through said periscope.

11. The dual-view, immersible periscope of claim 10 wherein said auxiliary housing is further adapted to receive selectively releasable torpedoes.

12. The dual-view, immersible periscope of claim 1 further including a weight sufficient to float upright with said viewing opening above water.

13. The dual-view, immersible periscope of claim 1 further including a selectively actuatable, waterproof audio chip for providing predetermined audio signals.

14. The dual-view, immersible periscope of claim 1 further including relay means for lengthening said housing.

15. The dual-view, immersible periscope of claim 14 wherein said relay means comprise Fresnel lenses that are arranged to operate in air even though said periscope is immersed in said fluid.

16. The dual-view, immersible periscope of claim 15 wherein said relay means comprise a pair of identical positive Fresnel lenses separated from one another by two effective focal lengths and wherein second reflection means comprises a roof mirror system for providing proper image orientation.

17. The dual-view, immersible periscope of claim 1 further including means for magnifying said views of said periscope.

18. The dual-view, immersible periscope of claim 1 wherein said housing is adapted to receive waterproof lights to provide underwater illumination of said views available through said periscope.

19. A dual-view periscope comprising:

an elongated tubular housing having two ends, one of said ends having an upward oriented viewing opening through which an observer may look into said housing and the other end having an entrance opening arranged generally perpendicular to said viewing opening;

means for partitioning said housing into at least two compartments, an upper compartment which encompasses said viewing opening and a lower compartment which encompasses said entrance opening, said partitioning means being structured and arranged so that, when said lower compartment is immersed in a fluid, light can travel between said upper and lower compartments while the fluid cannot;

first reflection means mounted in said upper compartment so that an observer's line-of-sight is folded downwardly and oppositely to its initial orientation; and second reflection means mounted in said lower compartment such that it is in a position to intercept the observer's folded line-of-sight and direct it through said entrance aperture to provide a first view which is generally forward looking but offset with respect to an observer's natural line-of-sight and such that an observer may look directly at said second reflection means through said viewing opening and be provided with a second view which is offset and generally opposite to the observer's natural line-of-sight, said housing, said partitioning means, and said first and second reflection means all being fabricated substantially of plastic.

* * * * *